US006752596B2

(12) United States Patent
Mondet et al.

(10) Patent No.: US 6,752,596 B2
(45) Date of Patent: *Jun. 22, 2004

(54) ROTARY-WING AIRCRAFT ROTORS WITH MANUALLY FOLDING BLADES AND ELECTRICAL CONNECTION INSTALLATION

(75) Inventors: Jean Mondet, Pelissanne (FR); Stéphane Mazet, Rognac (FR)

(73) Assignee: Eurocopter, Marignane (FR)

( * ) Notice: Subject to any disclaimer, the term of this patent is extended or adjusted under 35 U.S.C. 154(b) by 194 days.

This patent is subject to a terminal disclaimer.

(21) Appl. No.: 09/992,355

(22) Filed: Nov. 19, 2001

(65) Prior Publication Data

US 2002/0081201 A1 Jun. 27, 2002

(30) Foreign Application Priority Data

Dec. 11, 2000 (FR) .............................................. 00 16065

(51) Int. Cl.[7] .......................... B64C 27/39; B64C 27/50
(52) U.S. Cl. ..................... 416/95; 416/143; 244/134 D
(58) Field of Search ............................. 416/143, 146 R, 416/39, 95, 134 A, 141; 244/134 D; 219/201, 536, 549; 392/362; 338/214

(56) References Cited

U.S. PATENT DOCUMENTS

| 3,967,918 A | * | 7/1976 | Mouille et al. ............. 416/141 |
| 4,304,525 A | * | 12/1981 | Mouille ................... 416/134 A |
| 5,249,926 A | * | 10/1993 | D'Anna et al. ............. 416/143 |
| 5,769,606 A | | 6/1998 | Mondet et al. |
| 6,036,442 A | * | 3/2000 | Certain et al. ............. 416/143 |
| 6,149,386 A | * | 11/2000 | Rampal .................. 416/134 A |
| 6,216,979 B1 | | 4/2001 | Faure et al. |
| 6,447,249 B2 | * | 9/2002 | Potdevin ..................... 416/143 |
| 6,481,965 B2 | * | 11/2002 | Certain et al. ................ 416/95 |
| 6,485,261 B2 | * | 11/2002 | Mondet et al. ............... 416/95 |

FOREIGN PATENT DOCUMENTS

DE 199 22153 11/2000

* cited by examiner

Primary Examiner—Christopher Verdier
(74) Attorney, Agent, or Firm—Sturm & Fix LLP (57) ABSTRACT

On the rotor, between each blade and the member for linking with the hub, an electrical connecting cable comprises a first section of which one part is held above that one of the two blade pins which is the pivot pin about which the blade can be folded by pivoting, once the other blade pin has been removed. This holding is provided by a cradle formed in a cable support connected to the pivot pin, and by a collar articulated to one edge of the cradle and which can be folded down into the closed position onto the opposite edge of the cradle, to which this collar can be connected detachably by at least one detachable retaining element. The section of cable is manually released from the collar and from the cradle before the removal of the removable pin, which precedes folding, so that this section of cable deforms naturally, following the pivoting of the blade. Whilst the blade has been deployed, the releasable part of this section is once again retained in the cradle above the pivot pin by the closing of the collar.

11 Claims, 6 Drawing Sheets

ROTARY-WING AIRCRAFT ROTORS WITH MANUALLY FOLDING BLADES AND ELECTRICAL CONNECTION INSTALLATION

The invention relates to a rotary-wing aircraft rotor whose blades are, at least some of them, foldable and equipped with an electrical device requiring the transfer of electrical energy or signals between the blades and an electrical collector placed at the centre of the hub of the rotor, for example a de-icing device requiring routing of electrical energy to the blades from the collector. This transfer of electrical energy or signal is provided by an electrical connection installation, essentially comprising, for each blade, at least one electrical connecting cable, tied to a member for linking the corresponding blade to the hub of the rotor, and provided at its ends with connectors to ensure an electrical connection between the collector and the blade.

More precisely, the invention relates to a rotary-wing aircraft rotor, in particular a helicopter main rotor, of the type known in particular by EP-0 754 623 and FR 2 781 198 and comprising:

a hub, designed to be driven in rotation about an axis of the hub which is the axis of rotation of the rotor, at least two blades, each of which is connected to the hub by a link member that is substantially radial with respect to the axis of rotation, and a radially outer end of which is shaped as a fork in which the corresponding blade has a root retained by two substantially mutually parallel blade pins each passing through aligned bores in the fork and the blade root and each retained on the fork by at least one first removable retaining member, at least one blade being foldable on one side of the rotary-wing aircraft and having at least one removable blade pin so that removal of said removable pin from the blade root and from the fork of the link member, after removal of said at least first removable retaining member holding said removable blade pin on said fork, allows the blade to pivot about the other pin which forms a blade pivot pin, and an electrical connection installation comprising, for each blade, at least one electrical connecting cable connecting a first connector, carried by the hub and electrically connected on the latter, to a second connector on the blade and connected to at least one electrical device of said blade, for example a de-icing or anti-icing device.

On a rotor according to EP 0 754 623, the connecting cable, for at least one manually foldable blade, comprises a first section, radially towards the outside, arranged like an overhead hook extending from this blade to the corresponding link member, and connecting the second connector on this blade to a first end, in a radially outer position, of a second section of connecting cable, held substantially radially on this link member. This overhead hook of the connecting cable has a rounded cross section, possibly an armoured structure, and is connected to a pin connector of the second connector, which pin connector is connected to the socket of this second connector, this socket being fixed to the blade and connected to the electrical device of this blade.

During the foldings of the blade, the pivoting of the blade in the outer radial fork of the corresponding link member may introduce tensions that can damage the overhead hook and the second section of the connecting cable and the second connector, and/or this overhead hook may oppose complete folding of the blade.

In order to remedy this disadvantage, EP 0 754 623 makes provision for the pin connector of the second connector, on the corresponding end of the overhead hook of the connecting bale, to be connected removabley to the socket of the second connector, which is fixed to the blade. In fact, it is not recommended to give this overhead hook a length sufficient to allow the complete folding of the blade without disconnecting this connector, because an overhead hook of such length would have large forces applied to it and would be subjected to ample flutter movements, favouring its unwanted catching on or collision with adjacent components, such as blade root pendular anti-vibration devices or drag dampers, on a rotor in rotation, on which the corresponding blade carries out angular deflections in pitch, flapping and drag.

In consequence, if there is a desire to maintain the advantages afforded by the other characteristics of the connection installation described in EP 0 754 623, to which reference may advantageously be made for further details, it is not possible to avoid manual disconnection and connection between the pin connector and the socket of the second connector in the event of manual folding and unfolding (or deployment) of the blades, before folding and after returning a blade to the flight configuration, respectively.

FR 2 781 198 proposes improvements to rotors with foldable blades and an electrical de-icing installation according to EP 0 754 623, in particular for reducing the stresses and/or displacements of the connecting cable in its overhead hook section connecting the link member to the second connector on the blade, when the rotor is rotating and during the operations of folding and unfolding the blades.

For this purpose, according to FR 2 781 198, an elongated part of this overhead hook, of substantially flattened rectangular cross section, whose largest dimension is oriented substantially parallel with the axis of rotation of the rotor, is held in a member, mounted in a fixed manner or pivoting about the folding spindle, in the substantially axial projection of this folding spindle, and arranged as a fork in which the said elongated part of flattened cross section is engaged and held by at least one elastic tab. This retaining fork prevents the displacements of the overhead hook on either side of the folding spindle, during a blade's folding or unfolding, which prevents torsions harmful to this section of connecting cable, and it is no longer necessary to disconnect the connection between the overhead hook and the de-icing device at the second connector before folding the blade, provided the length of this overhead hook is sufficient without being so great as to give rise to the aforementioned disadvantages (whipping and snagging).

But the flattened rectangular cross section of this overhead hook section of cable above the link between the blade root and the link member may generate a certain amount of aerodynamic drag, and cause a disturbing slipstream phenomenon. Furthermore, considering the angular movements, in particular of flapping, of this section of cable and of its mechanical link with the link member, when that latter and the blade are carrying out these angular movements, it has proved necessary to form recesses in the periphery of a profiled dome covering the rotor head, and this amplifies the said slipstream phenomenon.

The basic problem for the invention is to overcome these disadvantages whilst avoiding the disconnection between the connecting cable and the second connector on the blade, for folding of the latter, and avoiding the formation of a disturbing slipstream, caused by recesses in the profiled dome surmounting the rotor head and by a section of connecting cable with a flat profile oriented substantially parallel with the axis of the rotor.

For this purpose, the rotary-wing aircraft rotor according to the invention, of the type described above, is characterized in that the connecting cable, for at least one foldable blade, comprises a first flexible section, of essentially cylindrical shape with a rounded cross section, preferably substantially circular, connecting the said second connector to a second section, held on the corresponding link member, of the said connecting cable, whose first section comprises a releasable part which, when the blade is in the flight configuration, is held above the said pivot pin by retaining means which are linked to the pivot pin and arranged in such a way that the releasable part of the first section of cable is manually releasable from the said retaining means, the said releasable part being manually released from the said retaining means before the said removable blade pin is removed, so that once the said removable blade pin has been removed, the folding of the blade by pivoting about the said pivot pin causes the first section of cable to curve and move naturally in order to accommodate the said folding without disconnecting at the second connector.

Advantageously, in a simple form of embodiment, the retaining means comprise a cradle, formed in a cable support and in which the said releasable part is retained by at least one collar articulated to one edge of the cradle and which can be folded down into the closed position onto the opposite edge of the cradle, to which the collar is intended to be fixed detachably, by at least one detachable retaining element, in a position of holding the said releasable part between the cradle and the collar, the said cable support being linked to the said pivot pin in such a way that after the said detachable retaining element has been detached and the said collar has been opened, the releasable part of the said first section of cable can be manually released from the cradle and from the said collar before the blade is folded.

The rounded shape of the cross section of the first section of cable sets up only a limited aerodynamic drag and allows, at the level of the connection with the second section of cable, a fixing much closer to the link member, such that it is no longer necessary to form recesses in a protective dome of the rotor head. Furthermore, no matter on which side of the helicopter the folding of a blade is carried out, the first section of connecting cable is held, when the blade is in the flight configuration, by its releasable part and by the intermediary of the collar and the cable support cradle, on that one of the two blade pins which constitutes the pivot pin for folding, so that once this section of cable has been manually released from the cradle and from the collar and the removable blade pin has been removed, this section of cable is completely free between the second connector, on the blade, and the second section of cable, on the link member, and can deform naturally, particularly can curve and move, so as to follow the blade in its folding without exerting damaging tension on the second connector which thus need not be disconnected.

Advantageously, the cable support is a support spindle engaged in the blade pivot pin, which is tubular, substantially along the axis thereof, and retained in substantially axial translation in the said pivot pin by at least one second removable retaining member.

In this case, according to an advantageously simple and economical arrangement, the cradle is formed in the upper end of the said support spindle which projects above the said blade pivot pin.

The second removable retaining member can comprise at least one safety pin intended to pass transversely through the support spindle and the blade pivot pin in their lower ends projecting under the fork of the corresponding link member so as to axially and rotationally retain the support spindle in the said blade pivot pin, and it is then advantageous for this safety pin at the same time to constitute the said first removable retaining member intended to retain the blade pivot pin in the position of retaining the blade root in the said fork, when the corresponding blade is in the flight configuration. Thus, if one or two spring pins is or are used to lock the blade pivot pin to the fork, when the blade is in the flight configuration, this or these spring pin(s) at the same time retains or retain the cable support spindle in the blade pivot pin.

Advantageously, the support spindle is retained in the blade pivot pin with a small axial clearance by the said safety pin bearing against a washer made of a synthetic material, preferably polyurethane, which surrounds the lower ends of the support spindle and of the pivot pin projecting under the fork and which comes into abutment against the underside of the fork.

In an advantageously simple embodiment, the detachable retaining element comprises at least one removable connecting pin connecting the collar and the support spindle and intended to keep the collar closed onto the cradle so as to keep the said releasable part in the cradle.

In an advantageously simple and economic embodiment, the collar is articulated with pivoting, substantially by one of its ends, about a bolt mounted laterally on the cradle substantially parallel to part of the removable connecting pin which passes through aligned bores in an opposite lateral part of the cradle and in the other end of the collar when the collar is in the closed position, which, projecting, carries a protrusion which, in flight, limits the movements of the removable connecting pin.

Also advantageously, as known from EP 0 754 623 and FR 2 781 198, and for the reasons given in these two documents, the second section of cable has an elongated part extending substantially radially and of substantially flattened rectangular cross section, maintained substantially flat on the top of the said link member, that is to say such that the largest dimension of its cross section is oriented substantially perpendicular to the axis of the rotor, in particular in order to facilitate the fixing of this second section of cable on the link member, to reduce the aerodynamic drag and to attenuate the mechanical forces applied to this section of cable.

Thus, the rotor according to the invention can also benefit from the advantages resulting from the use of other features of the electrical connection installation according to EP 0 754 623 and FR 2 781 198, to which reference can be made for more details, and the specifications of which are incorporated in the present specification by way of reference.

In particular, the second section of cable can be advantageously connected to the first connector on the hub by the intermediary of a third section of the connecting cable, the said third section comprising an overhead hook, in the shape of a flattened half-loop, of substantially flattened rectangular cross section whose largest dimension is substantially perpendicular to the axis of rotation, and whose concavity is facing substantially towards holding and articulation means connecting the corresponding link member to the hub, and substantially radially towards the axis of rotation, the said overhead hook being thus deformable in flexion and torsion in order to accommodate itself to the angular deflections in pitch, drag and flapping of the blade and of its link member with respect to the hub, as known from the two documents mentioned above.

Similarly, the second section of cable can advantageously be connected to the overhead hook of the third section of cable by a joint connected to the link member by a link which is articulated at least in pivoting manner about an axis substantially parallel with or slightly inclined with respect to the longitudinal pitch change axis of the link member and of the blade, in order to attenuate the mechanical forces applied to the connecting cable whilst allowing a good take-up of the forces applied to the latter when the rotor rotates and the corresponding blade is carrying out its angular deflections in pitch, flapping and drag, as proposed in FR 2 781 198.

Figure 1:
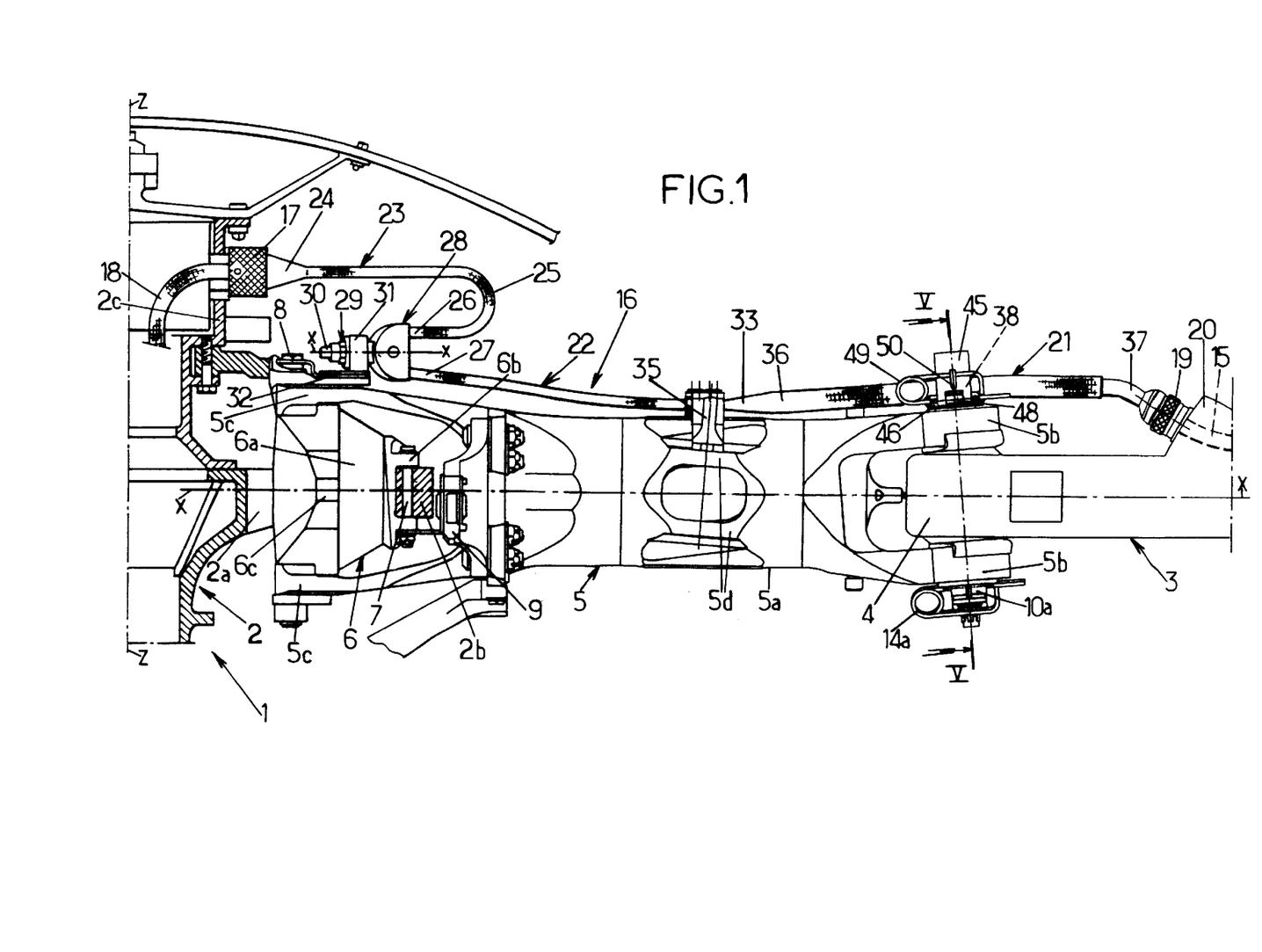
FIG. 1 is a partial view, partly in cross section and partly in side elevation, of a rotor according to the invention, with manually foldable blades, at the level of the link between a blade and the hub, and with the connecting cable associated with this blade in the electrical connection installation powering electrical devices for de-icing the rotor blades and/or for preventing them from icing.
Figure 2:
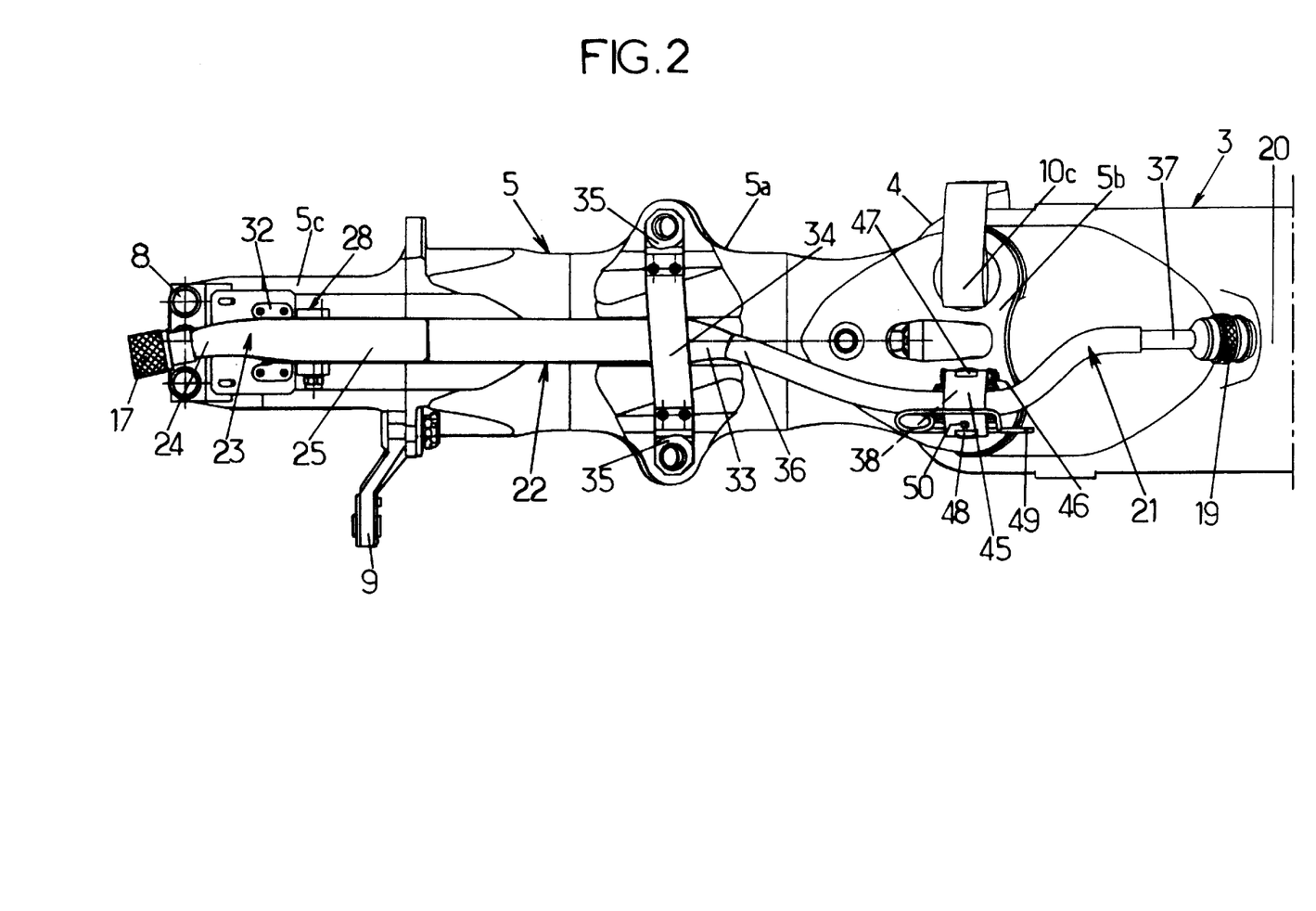
FIG. 2 is a partial diagrammatic plan view of the rotor shown in FIG. 1 with the blade unfolded in the flight position.

Other advantages and characteristics of the invention will emerge from the description given below, in a non-limitative manner, of a preferred example of embodiment, described with reference to the accompanying drawings in which:

FIGS. 1 and 2 show a main rotor of a helicopter, for example a four-blade rotor, with manual folding of the blades and of the general type described in EP 0 754 623 and FR 2 781 198.

It is recalled that the rotor shaft 1 is integral in rotation with the hub 2 about an axis Z—Z of rotation of the rotor, which is the common axis of the shaft 1 and the hub 2. In the flight configuration, each of the blades 3 is held by its root 4 on a link member 5, referred to as a sleeve in the rest of the description, and which is itself connected to the hub 2 by a retaining and articulation device 6.

On the rotor shown in FIGS. 1 and 2, the hub 2 is of the recessed radial plate type having, for each blade 3, an axial recess 2a housing the retaining and articulation device 6, comprising a laminated spherical stop of a well known type, for withstanding in compression the centrifugal forces during the rotation of the rotor, and to allow the angular deflection of each blade 3 and of its sleeve 5 in pitch, about the longitudinal axis X—X of change of pitch of the blade 3 in question, in flapping about a flapping axis perpendicular to the axes Z—Z and X—X, and in drag about a drag axis perpendicular to the axis X—X and substantially parallel with the axis Z—Z, the axes of flapping, drag and pitch being concurrent at the centre of the laminated spherical stop 6. This stop 6 comprises a central part 6a consisting of an alternated stack of rigid domes and of layers of an elastomer material, shaped like spherical caps whose concavity faces a radially external support 6b, by which the stop 6 is fixed, by bolts 7, to the radially outer edge 2b of the hub plate 2, at the level of the corresponding recess 2a. The stop 6 also comprises a radially internal support 6c, which traverses the recess 2a and is fixed as a cross-piece, by assemblies 8 with axial screws and nuts, between the two branches of a fork 5c at the radially inner end of the sleeve 5, whose central part 5a is substantially tubular around the longitudinal pitch change axis X—X, which is substantially radial with respect to the axis Z—Z. The radially outer end of each sleeve 5 is also designed as a fork 5b with two parallel prongs between which the root 4 of the corresponding blade 3 is held.

Each sleeve 5 carries, in lateral projection, for example on the trailing edge side of the corresponding blade 3, a pitch lever 9 which is articulated, in a known way (not depicted), to a pitch rod connected to a pitch control device, generally a swashplates assembly, for controlling the pitch of each blade 3 about its pitch change axis X—X.

Figure 6:
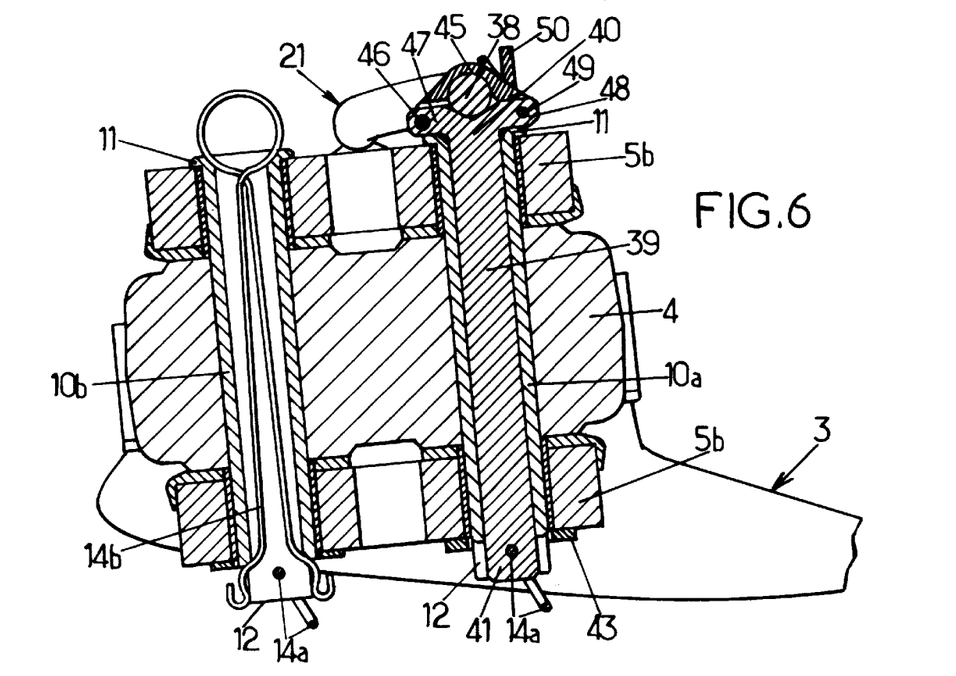
FIG. 6 is a view similar to FIG. 5 with one removable pin of conventional structure.
Figure 7:
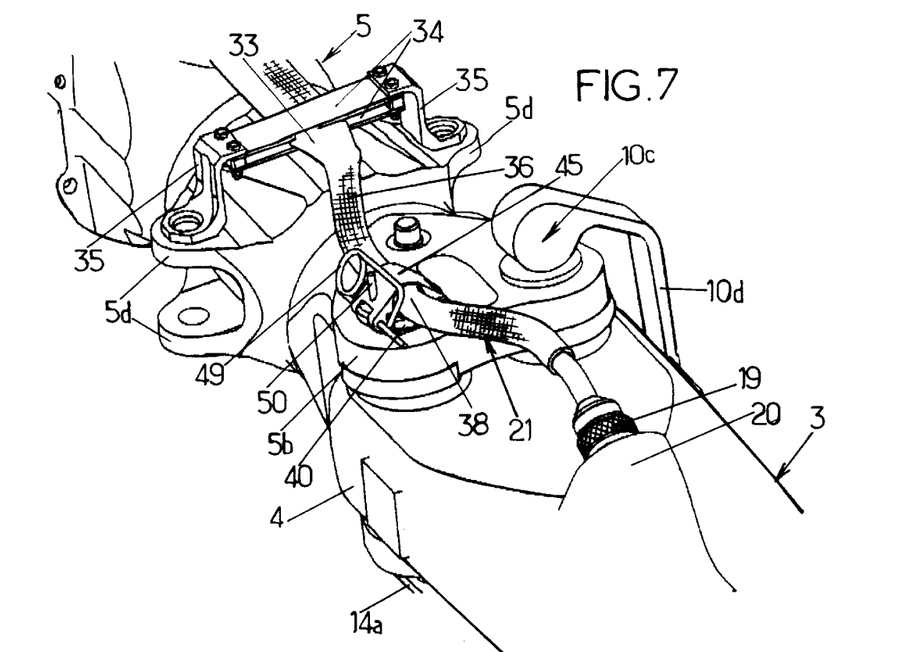
FIGS. 7 and 8 are perspective part views respectively showing the blade in the unfolded position and the blade in the folded position.

In the known way, each blade root 4 is held in the external fork 5b by two blade pins which, as depicted in FIG. 6, may both be of a conventional structure, that is to say two tubular pins 10a, 10b with a cylindrical overall shape of circular cross section which are mutually parallel and symmetric to one another on each side of the longitudinal axis X—X of the sleeve 5 and of the blade 3, the parallel axes of the blade pins 10a and 10b being inclined slightly towards the axis Z—Z of the rotor and upwards. As clearly depicted in FIG. 6, each blade pin 10a, 10b passes through aligned bores in the blade root 4 and in the two prongs of the fork 5b. Each blade pin 10a, 10b bears against the upper face of the upper prong of the fork 5b via a circular flange 11 projecting radially outwards at its upper end, and its tubular lower end 12 projects under the bottom prong of the fork 5b and is pierced with a pair of aligned holes through which a respective one of two safety spring pins 14a which constitute removable members for retaining the blade pins 10a, 10b on the fork 5b. One of the pins 10b, known as the removable blade pin for the reasons indicated hereinbelow, also has passing axially through it another safety spring pin 14b, also constituting a removable member for retaining the pin 10b on the fork 5b.

When the spring pins 14a thus pass transversely through the blade pins 10a, 10b, in their lower end 12 projecting under the fork 5b of the sleeve 5 and when the spring pin 14b passes through the pin 10b, the pins 14a and 14b hold the blade pins 10a, 10b in a position that retains the blade root 4 in the fork 5b when the corresponding blade 3 is in the flight configuration. However, the two blade pins 10a, 10b are removable, once the safety pins 14a and 14b have been removed, so that each blade 3 can be taken out, and each blade 3 can be folded manually by removing one 10b of the two blade pins and by pivoting the blade 3 via its root 4 about the other blade pin 10a which is held in position by the corresponding safety pin 14a.

Figure 3:
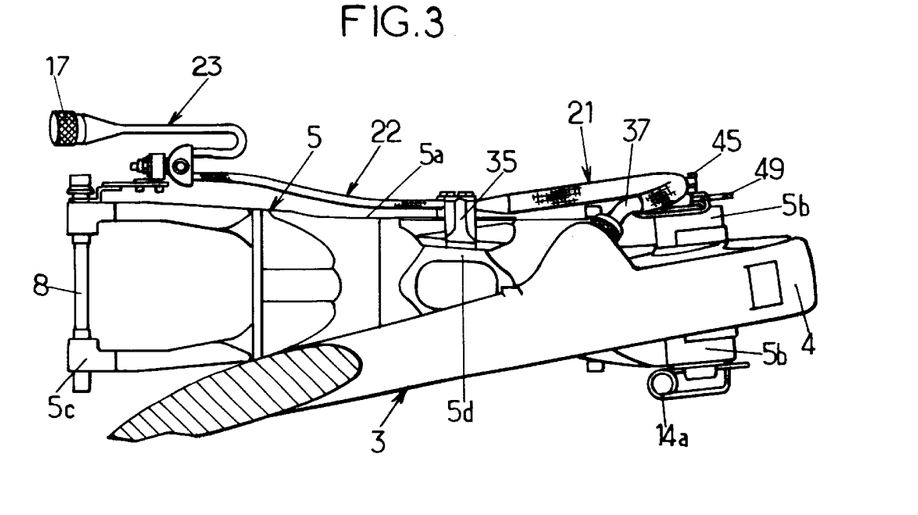
FIGS. 3 and 4 are diagrammatic part views corresponding respectively to FIGS. 1 and 2 but depicting the blade folded.
Figure 4:
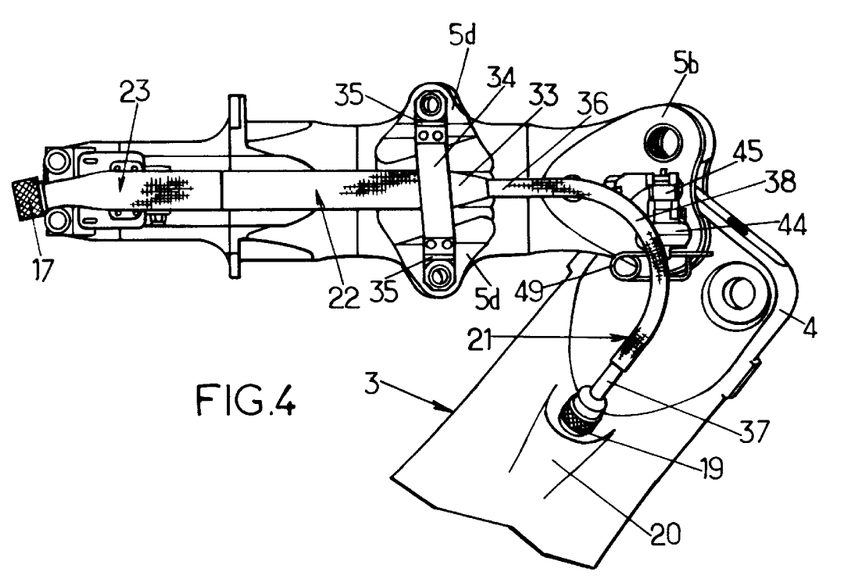
Figure 8:
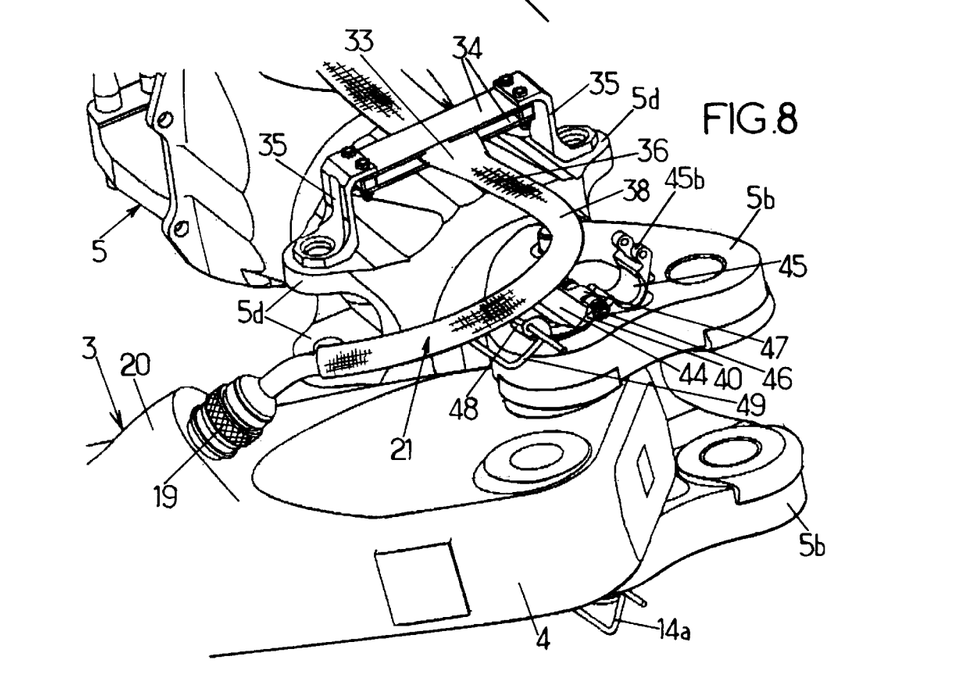
Figure 9:
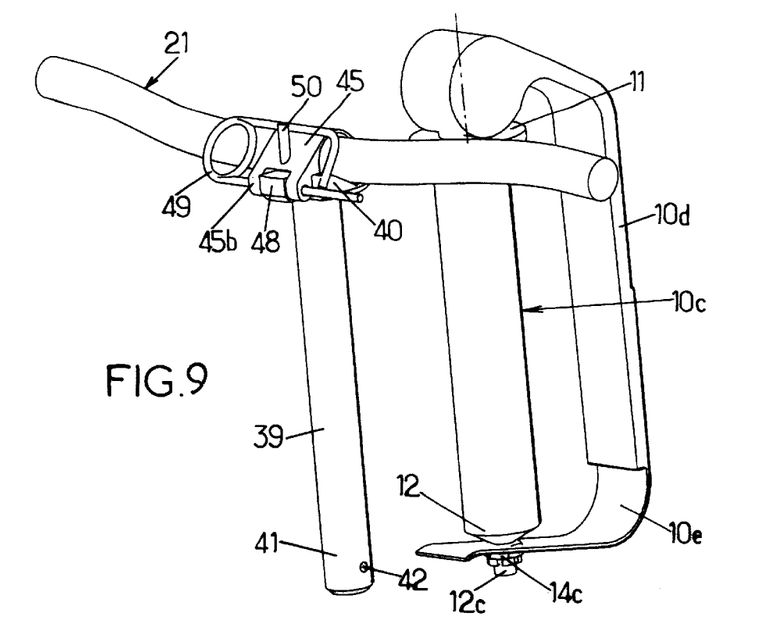
FIGS. 9 and 10 are perspective views showing an expanding pin and a support spindle with its cradle and its hook, respectively in the closed position and in the open position, for retaining and releasing the releasable part of the first section of connecting cable.
Figure 10:
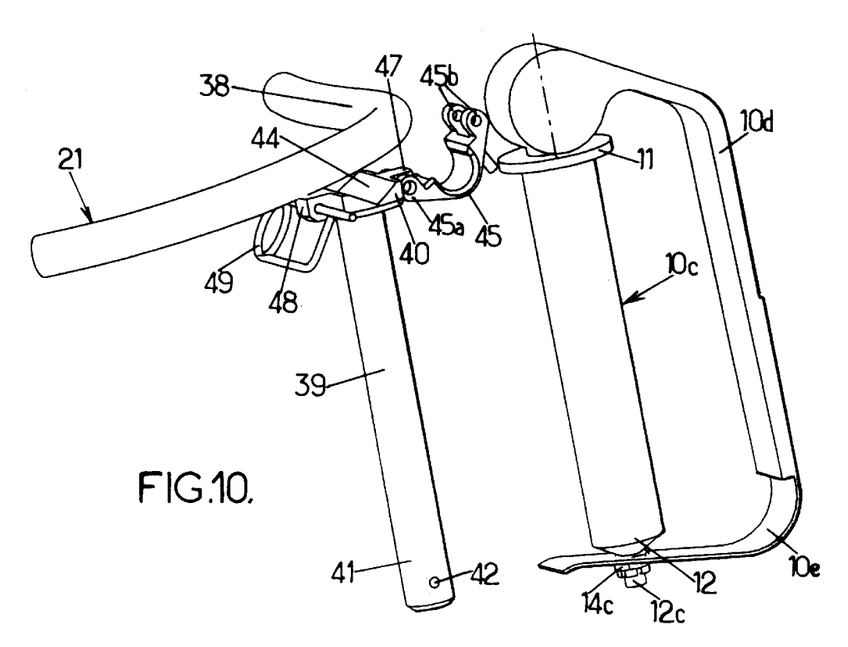

This conventional method of manual folding of the blades 3 is used, on a four-blade rotor with two pairs of diametrically opposed blades immobilized in rotation, for the folding, in such a way that the longitudinal axes X—X of the blades are inclined by about 45° to the longitudinal axis of the helicopter: the front left blade and the rear left blade are folded on the left hand side and toward the rear of the helicopter whilst the front right blade and the rear right blade are folded on the right hand side and towards the rear of the helicopter, as shown in FIGS. 3, 4 and 8, the direction of rotation being considered from the axis Z—Z of the rotor and starting from the radial direction of the longitudinal axis X—X of each blade in the flight position. In the case of blades which are folded to the right, folding is performed by removing the blade pin 10b, known as the removable pin, and by pivoting the blade root 4 about the blade pin 10a which acts as a pivot pin. On the other hand, in the case of blades which are folded to the left, folding is performed by removing the blade pin 10a (through which the pin 14b used to pass) and by pivoting the blade root 4 about the other blade pin 10b which acts as the pivot pin.

The structure and procedure for folding are described below only for a folding on the right hand side, as a folding on the left hand side is enabled by swapping the pins 10a and 10b and their associated means, as described hereinbelow, so that 10b is the pivot pin and 10a is the removable pin.

Figure 5:
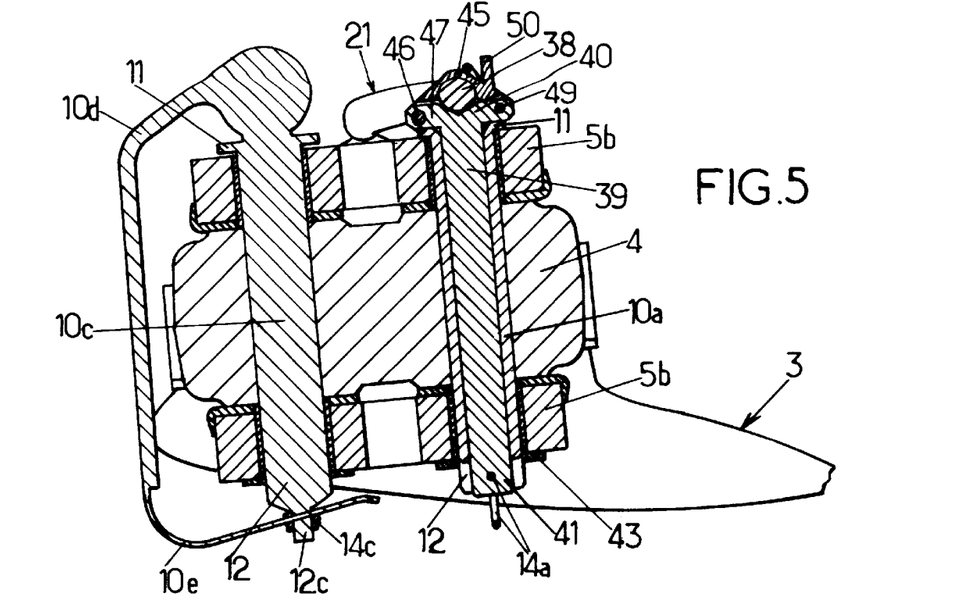
FIG. 5 is a view in cross section on V—V of FIG. 1, with one removable pin consisting of an expanding pin.

In both instances, as depicted in the section of FIG. 5 and in FIGS. 2, 7, 9 and 10, the conventional removable pin, such as 10b in the case of folding to the right, may be replaced by an expanding pin, of a well known type not described in detail here because it does not form part of the subject of the invention. It must simply be recalled that such an expanding pin, identified in its entirety as 10c, is a cylindrical tubular pin which is positioned as the conventional blade pin 10b and in place of the latter in the fork 5b and the blade root 4 and with respect to the pivot pin 10a. The expanding pin 10c contains, for example, an axial stack of Belleville washers (not depicted) which are axially compressed and therefore radially deformed in expansion, by the folding down of an handle 10d articulated onto the head of the pin 10c in the position depicted in FIG. 5, in which a shank 10e extending the handle 10d is retained for safety on the bottom end 12 of the pin 10c by a nut 14c screwed onto a threaded end piece 12c axially extending this lower end 12 downwards, under the fork 5b. In this position, the radial expansion of the pin 10c and of the Belleville washers it contains retains this pin 10c on the fork 5b and in the blade root 4. To remove the expanding pin 10c, which constitutes the removable blade pin, the shank 10e is released by unscrewing the nut 14c, and the handle 10d is raised by pivoting it upwards and to the side, which unloads the axial compression of the Belleville washers, which contract radially so that the pin 10c is no longer immobilized in the blade root 4 and the fork 5b and can be removed axially from the latter elements upwards to allow the blade to be folded by pivoting about the other pin 10a, which has a conventional structure.

Expanding pins of this type are marketed, particularly by the following companies in the United States of America. AVIBANK MFG., INC., 210 S. Victory Blvd., Burbank, Calif., 91502 and SHUR-LOK CORPORATION S.A., 2541 White Road, Irvine, Calif. 92714.

The rotor is equipped with an electrical connection installation, for example for electrically powering electrical de-icing and/or anti-icing equipment, mounted on each blade 3, from the electrical system on board the helicopter, by means of a rotating collector (not shown) placed at the centre of the hub 2.

The term electrical de-icing and/or anti-icing equipment should be understood to refer to any equipment necessitating an electrical power supply for its operation, command or control, such a de-icing or anti-icing equipment equipping each blade 3 and comprising an array of electrically conductive wires integrated in the blade 3, close to its leading edge, the radially inner end of this conductor array emerging on the upper surface of the blade 3, close to its root 4, substantially on the longitudinal axis X—X, in the form of a cable 15 grouping several elongated electrical conductors.

For each of the blades 3, this connection installation comprises an electrical connecting cable 16, comprising several elongated electrical conductors, substantially parallel with each other, embedded in an electrically insulating covering support, insulating the conductors from one another, and itself at least partially surrounded by a mechanically protective cover. This cable 16 is, at one end in the radially inner position, connected to a first connector 17, fixed to a central tubular support 2c which is itself fixed to the central part of the hub 2 and powered by an electrical power supply cable 18 connected to the collector, in such a way that the first connector 17 electrically connects the cable 16 to the power supply cable 18. At its other end, in the radially outer position, the cable 16 is connected to a second connector 19, mounted on a casing 20 fixed on the top of the blade root 4 and substantially centered on the axis X—X, and electrically connected to the cable 15 of the electrical de-icing and/or anti-icing conductors of that blade 3, in such a way that the cable 16 is electrically connected to this cable 15 by the second connector 19.

The connecting cable 16 essentially comprises three sections 21, 22 and 23, in succession, including a first, radially outward section 21, which connects the second conductor 19 to the second section of cable 22, in a radially intermediate position, and extending over the corresponding sleeve 5, on the top part of which the section 22 is held substantially at its two ends, this second section 22 being itself connected to the first connector 17 by the intermediary of the third, radially inner, section 23.

The third section 23 is produced essentially as described in EP 0 754 623 and FR 2 781 198, that is to say in the form of an elongated section of cable having a flattened rectangular cross section, whose largest side extends substantially perpendicular to the axis Z—Z and of which one end, in the radially inner position, is connected to the connector 17 by a joint 24 of varying cross section, whilst its radially outer part is folded back on itself in a flattened half-loop forming an overhead hook 25, whose concavity substantially faces radially towards the axis Z—Z and also towards the laminated spherical stop 6 attaching the sleeve 5 to the hub 2. This elongated part of the cable forming, in particular, the hook 25 can have a non-armoured structure like that of FIG. 2a of EP 0 754 623 and described with reference to that figure, with elongated parallel electrical conductors, spaced from one another and embedded in an insulating covering support which is elastically deformable (elastomer or natural rubber), this support being confined between two strips of cloth constituting the major faces of the section 23. These special structure and arrangement procure important advantages, mentioned in the said patents, in particular allowing this third section 23, and in particular its overhead hook 25, to deform in flexion and torsion in order to accommodate itself to angular deflections of the flapping mass constituted by the corresponding blade 4 and its sleeve 5, in pitch, flapping and drag, about the centre of the spherical stop 6 and with respect to the hub 2.

Furthermore, the end 26 of the third section 23 which is opposite to the joint 24 is connected to the radially inner end 27 of the second section 22 essentially as described in FR 2 781 198, that is to say by an articulated support 28, forming a joint between the ends 26 and 27 of the two sections 23 and 22, and held on the sleeve 5 on which this support 28 is articulated by a link 29 which is at least pivoting about a geometrical axis x—x substantially parallel with the longitudinal axis X—X of the sleeve 5 of the corresponding blade 3, but able to be slightly inclined with respect to this longitudinal axis X—X. As described with reference to FIG. 1a of FR 2 781 198, this pivoting link 29 comprises the support 28 integral with one end of a pivot spindle 30, coaxial with the axis x—x and mounted in a pivoting manner, preferably with the interposition of a self-lubricating bearing, inside a coaxial sleeve 31 fixed to a plate 32 which is itself fixed, for example by screwing, to the upper prong of the fork 5c of the sleeve 5, at the level of the head locks of the threaded studs of the assemblies 8 connecting the inner support 6c of the laminated spherical stop 6 in the radially inner fork 5c of the sleeve 5.

Thus, the joint-support 28, providing mechanical and electrical continuity between the ends 26 and 27 of the sections 23 and 22, is not stressed by the rotations of the sleeve 31 and of the plate 32 with the sleeve 5 about its pitch axis X—X.

This articulated link 29 of the joint-support 28 on the sleeve 5 procures the important advantages mentioned in FR 2 781 198, in particular that of improving the mechanical and electrical performance of the connecting cable 16, in particular by attenuating the mechanical forces applied to the third section of cable 23, as well as a good take-up of the forces applied to this section 23 when the rotor is rotating and the blade 3 is making, with the corresponding sleeve 5, angular pitch movements, at the pitch control frequency of the blades, which introduce torsional deformations with this frequency of the third section of cable 23. This articulated pivoting link 29 therefore ensures that the connecting cable 16 has a longer service life.

As a variant, as shown in FIG. 2 of FR 2 781 198, the articulated pivoting link 29 can be replaced by an articulated, ball-joint link, also in order to improve the accommodation of the hook 25 to the angular movements of the flapping mass (3–5) in drag and in flapping. In this case, a ball-joint can be held, on the one hand, about the spindle 30 with which the joint-support 28 is integral, and, on the other hand, inside the sleeve 31, in such a way as to allow not only the overall pivoting of the ends 26 and 27 with the joint-support 28 about the geometric axis x—x of the spindle 30, with respect to the sleeve 31 and the plate 32 integral with the sleeve 5, during the pitch movements of the latter, but also the overall pivoting of the ends 26 and 27 with this ball-joint, centered in a substantially radial plane passing through the axes Z—Z and X—X, when the sleeve 31 and the plate 32 are carrying out, with the sleeve 5, angular deflections in flapping and drag about the center of articulation of the laminated spherical stop 6. An angular play of a few degrees in drag and flapping, provided by the ball-joint, suffices to reduce very substantially the flexion and torsion stresses that can be undergone by the sections 23 and 22 of the connecting cable 16, due to the drag and flapping movements of the blades 3, and this results in a considerable extension of the service life of the cable 16.

The second section of cable 22 is substantially straight or slightly undulated (see FIG. 2) and extends substantially radially on the upper face of the sleeve 5 up to its end 33, in the radially outer position, formed as a joint of varying cross section, located radially outside of the hook 25. The section of cable 22 has substantially the same shape of flattened rectangular cross section and the same non-armoured structure as the section 23, such that the central part of the section 22 is an elongated part, the largest dimension of its rectangular cross section being substantially perpendicular to the axis of rotation Z—Z, when the sleeve 5 is in the rest state. In the proximity of its radially outer end 33, the second section 22 is clamped between two transverse braces 34 passing above the sleeve 5 and bolted at their ends on two fixing angle-bracket ends 35 (see FIGS. 7 and 8) each intended to be held by a spindle (not shown) on the respective one of the two attachment forks 5d, protruding laterally outwards and on each side of the central part 5a of the sleeve 5, in order to attach to the latter the ball end-pieces of two drag dampers, whose other ends are attached to the sleeves 5 of the two adjacent blades 3, in an inter-blade configuration of the drag dampers, or to the hub 2 in a more conventional manner.

Thus, the section of cable 22 is maintained substantially flat on the top of the sleeve 5, to which it is tied at its inner end 27, by the articulated link 29 described above, and at its outer end 33 by a second link, provided by the braces 34 and the said end-pieces 35 and by the retaining spindles in the forks 5d of the sleeve 5.

The end 33 of the section 22 is connected mechanically and electrically at one end 36, in the radially inner position, of the first section 21, which is a cylindrical end of circular cross section.

The first section of cable 21 connects the sleeve 5, to which it is bound by its inner end 36 and by the intermediary of the end 33 of the section 32, to the blade 3 whilst being connected, at its other end 37, in the radially outer position, to the connector 19 for connecting the de-icing cable 15. This first section 21 has a generally cylindrical shape of rounded cross section, preferably circular, and it is flexible, except possibly at its end 37 connected to the connector 19 and which can be armoured.

In its central portion, the section 21 comprises a part 38 known as the "releasable" part which, when the blade 3 is in the flight position (see FIGS. 1 and 2), is held above that one of the two blade pins 10a and 10b or 10c which is the pivot pin for this blade 3, that is to say above the pin 10a, and this holding is provided by retaining means which are linked to the pivot pin 10a, the releasable part 38 of the section 21 being manually released from these retaining means before the conventional 10b or expanding 10c removable blade pin is removed so that during the operations of folding and unfolding the blade 3, the section 21 is totally free between its ends 36 and 37 and deforms naturally, curving and moving to accommodate the pivoting of the blade 3 with respect to the sleeve 5 without the need for disconnection at the connector 19 on the blade 3.

FIGS. 1 to 8 by way of example depict a blade 3 which folds to the right (see FIGS. 3, 4 and 8) which means that the blade pivot pin is the pin 10a and that the removable blade pin is the conventional pin 10b (FIG. 6) or the expanding pin 10c (FIG. 5).

The means for retaining the releasable part 38 of the section 21, when the blade is in the folded position, are now described with more particular reference to FIGS. 5 to 10.

These retaining means comprise a cable support spindle 39 which is mounted on the blade pivot pin 10a by engaging it inside this tubular pin 10a from above and along the axis of this pin 10a, which is the axis of folding of the blade 3, until a cradle 40 at the top end of the support spindle 39 bears against the circular flange 11 at the upper end of the pin 10a. The support spindle 39 has a cylindrical shape substantially coaxial with the tubular pin 10a in which the support spindle 39 is retained axially, with a small amount of clearance, and in rotation by virtue of a diametral orifice 42 passing through this support spindle 39 in its lower end 41, housed in the lower end 12 of the pin 10a and therefore projecting under the fork 5b. This orifice 42 of the lower end 41 may be aligned with the opposed holes in the lower end 12 of the pin 10a so that the spring pin 14a that holds the pin 10a in the fork 5b can pass through them so that the spring pin 14a at the same time constitutes a removable retaining member axially retaining the support spindle 39 in the pin 10a. Removal of the spring pin 14a allows the support spindle 39 to be removed from the pin 10a, then allows the pin 10a to be removed from the fork 5b and from the blade root 4, or allows the support spindle 39 to be removed at the same time as the pin 10a, to allow the blade 3 to be removed.

However, in the flight position as during foldings or unfoldings of the blade 3, the support spindle 39 is held captive by the pivot pin 10a retained on the fork 5b and in the blade root 4. The support spindle 39 is prevented from axial translation in the pin 10a with a small amount of clearance by the pin 14a which bears against a polyurethane washer 43 surrounding the lower end 12 of the pin 10a and bearing against the underside of the bottom prong of the fork 5b.

The cradle 40 is formed in the upper end of the support spindle 39 which projects axially above the pivot pin 10a and laterally on the opposite two sides of this pin 10a, and this cradle 40 has a cavity 44 of flattened V-shaped cross section with the concave face facing upwards, to accommodate the releasable part 38 of the section of cable 21.

The two inclined planes of the cradle 40 meet along a lower edge directed substantially radially with respect to the axis Z—Z or substantially parallel to the longitudinal axis X—X of the blade 3 when the support spindle 39 is prevented from rotating in the pin 10a by the pin 14a.

As an alternative, the recess 44 of the cradle 40 may be delimited by a portion of cylindrical surface with an axis substantially parallel to the axis X—X.

The releasable part 38 of the section of cable 21 is housed in the cradle 40 and retained therein by a collar 45 articulated along one side of the cradle 40. The collar 45, in the form of a substantially hemicylindrical bow, has each of its two ends arranged as a fork with two parallel lugs pierced with coaxial bores, and by means of one 45a of its two forks, the collar 45 is mounted so that it can pivot about a pivot axis parallel to the edge of the bottom of the cradle 40 and materialized by a bolt 46 (see FIGS. 5, 6 and 8) passing through a lateral arm 47 of the cradle 40 and the two lugs of this fork 45a. The collar 45 can be folded down over the releasable part 38 of the cable 21 arranged in the cradle 40 and in such a way that the fork 45b at the other end of the collar 45 straddles a lateral arm 48 of the cradle 40, projecting from the opposite side to the arm 47, a safety spring pin 49 then being able to be engaged in the bores of the fork 45b and in an orifice in the arm 48 so as to connect the collar 45 detachably to the cradle 40 when the collar 45 is in the closed position so as to retain the releasable part 38 of the section of cable 21. The pin 49 thus constitutes a detachable retaining element for producing a removable connection between the end fork 45b of the collar 45 and the cradle 40 of the support spindle 49, and the part of this pin 49 which passes through the aligned bores of the fork 45b of the collar 45 and of the lateral arm 48 of the cradle 40 when the collar 45 is in the closed position is substantially parallel to the bolt 46.

To limit the travel of the pin 49, when the rotor turns, the collar 45 bears, projecting outwards and near to its end fork 45b collaborating with the pin 49, a stud 50 in the form of a little pin and which may, as an alternative, also consist of a nib of material.

Thus, starting out from a position depicted in FIGS. 1, 2, 5 or 6, 7 and 9, which corresponds to the unfolded position of the blade 3, or flight position, in which the releasable part 38 of the section of cable 21 is retained between the cradle 40 and the collar 45, detaching the pin 49 allows the collar 45 to be opened into the position depicted in FIGS. 3, 4, 8 and 10, which allows the releasable part 38 to be disengaged manually from the cradle 40, so that when the removable blade pin 10b or 10c has then been removed, the blade 3 can be folded manually about the pivot pin 10a, taking with it the first section of cable 21 which curves and moves naturally to accommodate the pivoting movement of the blade 3 without disconnecting at the second connector 19.

Starting out from the blade 3 in the flight position, in which the section of cable 21 has, when viewed in plan (FIGS. 2 and 7), a curved shape with the concave face facing towards the removable pin 10c or 10b, except near its radial outer end 37 where this section 21 is bent back slightly, it is found that during the folding of the blade 3 to the right, the section of cable 21 adopts a curvature in the opposite direction, with the concave side facing towards the folded blade (see FIGS. 4 and 8).

In order to proceed with folding the blade 3, the operator detaches the pin 49 connecting the collar 45 to the lateral arm 48 of the cradle 40, then opens the collar 45 and releases the releasable part 38 of the section of cable 21, then refits the pin 49 on the arm 48 and finally removes the expanding 10c or conventional 10b removable blade pin after which the blade 3 can be folded manually by pivoting about the pivot pin 10a.

At the end of folding, the removable pin 10c or 10b and its spring pin or pins 14a and 14b can be refitted so as to avoid losing these parts.

On unfolding the blade 3, after having pivoted this blade in such a way that it lies in the longitudinal continuation of the sleeve 5 and so that its blade root 4 is fully engaged in the fork 5b, the operator fits the expanding 10c or conventional 10b removable blade pin in the aligned bores of the fork 5b and of the blade root 4 and the corresponding spring pin or pins 14a and 14b, then detaches the pin 49 from the arm 48 of the support spindle 39, positions the releasable part 38 of the portion of cable 21 in the cradle 40 and folds the collar 45 down into the closed position over the top of this releasable part 38 and finally refits the pin 49 in position in the fork 45b of the collar 45 and in the arm 48 of the cradle 49 so as to close the collar 45 onto the cradle 40 and return to a configuration suited to flight.

The benefit of this device is that, during the phases of folding and unfolding, this device requires only a limited handling of components which cannot become lost because they are always linked to the support spindle 39, except for the pin 49, which is independent, and is preferably always replaced in its housing in the arm 48 of the support spindle 39, to avoid becoming lost.

It is also found that in the flight position, no excess length or loop needs to be provided on the section of cable 21, and that a single type of connecting cable 16 is needed for folding the blade to the right or to the left, because in the flight position, the two ends 36 and 37 of the section of cable 21 are substantially along the longitudinal axis X—X of the blade 3 and of its sleeve 5, and that swapping over the removable pin 10b or 10c and the pivot pin 10a with the support spindle 39 equipped with the cradle 40 and with the collar 45, in order to change from a blade that folds to the right to a blade that folds to the left has the sole consequence of reversing the direction of curvature of this section of cable 21.

As an alternative, when the cradle 40 is a cradle of semicylindrical shape, the removable retaining member that retains the releasable part 38 of the section of cable 21 in the cradle 40 may simply be a safety spring pin which is mounted detachably on the two opposed sides of the cradle 40, passing over the releasable part 38, which the spring pin can thus hold in the cradle 40. The spring pin thus at the same time constitutes a simplified version of the collar and the element for detachably retaining this simplified collar in the position in which it retains the releasable part 38 of the section of cable 21 in the cradle 40.

What is claimed is:

1. A rotary-wing aircraft rotor of the type comprising:
    a hub, designed to be driven in rotation about an axis of the hub which is the axis of rotation of the rotor, at least two blades, each of which is connected to the hub by a link member that is substantially radial with respect to the axis of rotation, and a radially outer end of which is shaped as a fork in which the corresponding blade has a root retained by two substantially mutually parallel blade pins each passing through aligned bores in the fork and the blade root and each retained on the fork by at least one first removable retaining member, at least one blade being foldable on one side of the rotary-wing aircraft rotor and having at least one removable blade pin so that removal of said removable pin from the blade root and from the fork of the link member, after removal of said at least one first removable retaining member holding said removable blade pin on said fork, allows the blade to pivot about the other pin which forms a blade pivot pin, and an electrical connection installation comprising, for each blade, at least one electrical connecting cable connecting a first connector, carried by the hub and electrically connected on the hub, to a second connector on the blade and connected to at least one electrical device on said blade, wherein the connecting cable for at least one foldable blade, comprises a first flexible section, of essentially cylindrical shape with a rounded cross section, connecting said second connector to a second section, held on the corresponding link member, of said connecting cable, whose first section comprises a releasable part which, when the blade is in the flight configuration, is held above said pivot pin by retaining means which are linked to the pivot pin and arranged in such a way that said releasable part of the first section of cable is manually releasable from said retaining means, said releasable part being manually released from said retaining means, said releasable part being manually released from said retaining means before said removable blade pin is removed, so that once said removable blade pin has been removed the folding of the blade by pivoting about said pivot pin causes the first section of cable to curve and move naturally in order to accommodate said folding without disconnecting at the second connector.

2. A rotor according to claim 1, wherein the retaining means comprise a cradle, formed in a cable support and in which said releasable part is retained by at least one collar articulated to one edge of the cradle and which can be folded down into the closed position onto the opposite edge of the cradle, to which the collar is intended to be fixed detachably, by at least one detachable retaining element, in a position of holding said releasable part between the cradle and the collar, said cable support being linked to said pivot pin in such a way that after said detachable retaining element has been detached and said collar has been opened, the releasable part of said first section of cable can be manually released from the cradle and from said collar before the blade is folded.

3. A rotor according to claim 2, wherein said cable support is a support spindle engaged in the blade pivot pin, which is tubular, substantially along the axis thereof, and retained in substantially axial translation in said pivot pin by at least one second removable retaining member.

4. A rotor according to claim 3, wherein said cradle is formed in an upper end of said support spindle which projects above said blade pivot pin.

5. A rotor according to claim 3, wherein said second removable retaining member comprises at least one safety pin intended to pass transversely through said support spindle and said blade pivot pin in lower ends thereof projecting under the fork of the corresponding link member, said safety pin at the same time forming said first removable retaining member intended to retain said blade pivot pin in the position of retaining the blade root in said fork.

6. A rotor according to claim 5, wherein the support spindle is retained in the blade pivot pin with a small axial clearance by said safety pin bearing against a washer made of a synthetic material, which surrounds the lower ends of the support spindle and pivot pin projecting under the fork and which comes into abutment against the underside of the fork.

7. A rotor according to claim 2, wherein said detachable retaining element comprises at least one removable connecting pin connecting the collar and the support spindle and intended to keep the collar closed onto the cradle so as to keep said releasable part in the cradle.

8. A rotor according to claim 7, wherein the collar is articulated in pivoting manner, substantially by one of its ends, about a bolt mounted laterally on the cradle substantially parallel to a part of the removable connecting pin which passes through aligned bores in an opposite lateral part of the cradle and in the other end of the collar when the collar is in the closed position, which collar carries a protrusion which, in flight, limits the movements of the removable connecting pin.

9. A rotor according to claim 2, wherein the second section of cable has an elongated part of substantially flattened rectangular cross section, maintained substantially flat on the top of the link member and extending substantially radially.

10. A rotor according to claim 2, wherein said second section of cable is connected to the first connector on the hub by a third section of the connecting cable, said third section comprising an overhead hook, in the shape of a flattened half-loop, of substantially flattened rectangular cross section whose largest dimension is substantially perpendicular to the axis of rotation, and whose concavity is facing substantially towards retaining and articulating means connecting the corresponding link member to the hub and substantially radially towards the axis of rotation, said overhead hook being thus deformable in bending and in torsion in order to accommodate the angular deflections in pitch, drag and flapping of the blade and corresponding link member with respect to the hub.

11. A rotor according to claim 10, wherein the second section of cable is connected to the overhead hook of the third section of cable by a joint connected to the link member by a link which is articulated at least in pivoting manner about an axis substantially parallel with or slightly inclined with respect to the longitudinal pitch change axis of the link member and of the blade.

* * * * *